United States Patent
Lev et al.

(10) Patent No.: US 12,525,064 B2
(45) Date of Patent: Jan. 13, 2026

(54) DETECTION OF AN ARTIFICIAL IRIS FOR SPOOFING AN IRIS RECOGNITION SYSTEM

(71) Applicant: NEC Corporation Of America, Herzlia (IL)

(72) Inventors: Tsvi Lev, Tel-Aviv (IL); Yaacov Hoch, Ramat-Gan (IL); Hagai Har-Gil, Ramat Gan (IL)

(73) Assignee: NEC Corporation Of America, Herzlia (IL)

( * ) Notice: Subject to any disclaimer, the term of this patent is extended or adjusted under 35 U.S.C. 154(b) by 302 days.

(21) Appl. No.: 18/199,987

(22) Filed: May 22, 2023

(65) Prior Publication Data

US 2024/0395070 A1    Nov. 28, 2024

(51) Int. Cl.
| | |
|---|---|
| *G06V 10/26* | (2022.01) |
| *G06T 7/10* | (2017.01) |
| *G06V 10/141* | (2022.01) |
| *G06V 10/70* | (2022.01) |
| *G06V 40/18* | (2022.01) |
| *G06V 40/40* | (2022.01) |

(52) U.S. Cl.
CPC ............... *G06V 40/40* (2022.01); *G06T 7/10* (2017.01); *G06V 10/141* (2022.01); *G06V 10/26* (2022.01); *G06V 10/70* (2022.01); *G06V 40/197* (2022.01); *G06T 2207/10048* (2013.01); *G06T 2207/20081* (2013.01)

(58) Field of Classification Search
None
See application file for complete search history.

(56) References Cited

U.S. PATENT DOCUMENTS

2019/0019025 A1*  1/2019  Yamazaki .............. G06V 40/19

OTHER PUBLICATIONS

A Novel Anti-Spoofing Solution for Iris Recognition Toward Cosmetic Contact Lens Attack Using Spectral ICA Analysis. | Sheng-Hsun Hsieh, Yung-Hui Li, Wei Wang and Chung-Hao Tien | (Year: 2018).*

* cited by examiner

*Primary Examiner* — Idowu O Osifade (57) ABSTRACT

There is provided a computer implemented method of detecting an attempt to breach security of an iris recognition system by an artificial iris, comprising: analyzing at least a portion of a limbal ring depicted in an image of an iris of an individual captured by an imaging sensor at a wavelength range within at least one of near infrared (NIR) and short wave infrared (SWIR), and detecting likelihood of an artificial iris worn by the individual according to the analysis of the at least the portion of the limbal ring.

17 Claims, 4 Drawing Sheets

DETECTION OF AN ARTIFICIAL IRIS FOR SPOOFING AN IRIS RECOGNITION SYSTEM

FIELD AND BACKGROUND OF THE INVENTION

The present invention, in some embodiments thereof, relates to security and, more specifically, but not exclusively, to systems and methods for securing iris recognition systems.

Iris recognition systems analyze images of an individual's iris, in order to validate the identity of the individual. For example, to grant access to a secure building, and/or provide a general confirmation of identity such as for updating government records.

SUMMARY OF THE INVENTION

According to a first aspect, a computer implemented method of detecting an attempt to breach security of an iris recognition system by an artificial iris, comprises: analyzing at least a portion of a limbal ring depicted in an image of an iris of an individual captured by an imaging sensor at a wavelength range within at least one of near infrared (NIR) and short wave infrared (SWIR), and detecting likelihood of an artificial iris worn by the individual according to the analysis of the at least the portion of the limbal ring.

According to a second aspect, a system for detecting an attempt to breach security of an iris recognition system by an artificial iris, comprises: at least one processor executing a code for: analyzing at least a portion of a limbal ring depicted in an image of an iris of an individual captured by an imaging sensor at a wavelength range within at least one of near infrared (NIR) and short wave infrared (SWIR), and detecting likelihood of an artificial iris worn by the individual according to the analysis of the at least the portion of the limbal ring.

According to a third aspect, a non-transitory medium storing program instructions for detecting an attempt to breach security of an iris recognition system by an artificial iris, which when executed by at least one processor, cause the at least one processor to: analyze at least a portion of a limbal ring depicted in an image of an iris of an individual captured by an imaging sensor at a wavelength range within at least one of near infrared (NIR) and short wave infrared (SWIR), and detect likelihood of an artificial iris worn by the individual according to the analysis of the at least the portion of the limbal ring.

In a further implementation form of the first, second, and third aspects, the wavelength range within at least one of NIR and SWIR is between about 850 nanometers and about 1400 nanometers.

In a further implementation form of the first, second, and third aspects, further comprising activating an illumination source for illuminating the iris of the individual with an illumination at the wavelength range.

In a further implementation form of the first, second, and third aspects, analyzing the at least the portion of the limbal ring comprises computing a sharpness metric indicating sharpness of a boundary of the limbal ring and sclera and/or iris, and detecting likelihood of the artificial iris when the sharpness metric is above a threshold indicating sharpness of the boundary.

In a further implementation form of the first, second, and third aspects, the image likely excludes the artificial iris when the sharpness metric is below the threshold, for indicating diffusion of the boundary.

In a further implementation form of the first, second, and third aspects, analyzing the at least the portion of the limbal ring comprises segmenting the portion of the limbal ring, and feeding the segmented at least the portion of the limbal ring into a machine learning model, wherein the detecting the likelihood of the artificial iris is obtained as an outcome of the machine learning model.

In a further implementation form of the first, second, and third aspects, further comprising training the machine learning model by: for each sample image of a plurality of sample images of a plurality of sample individuals, each sample image depicting an iris of a sample subject captured by the imaging sensor at the wavelength range within at least one of NIR and SWIR, wherein a first set of sample images depict the sample subjects wearing an artificial iris and a second set of sample images depict the sample subjects that are not wearing the artificial iris: segmenting at least a portion of the limbal ring, and creating a training record including the segmented at least the portion of the limbal ring, and a ground truth indicating whether the sample subject is wearing an artificial iris or is not wearing the artificial iris, creating a multi-record training dataset including a plurality of the training records for the plurality of sample images, and training the machine learning model on the training dataset.

In a further implementation form of the first, second, and third aspects, analyzing the at least the portion of the limbal ring comprises: wherein the image comprises a first image, computing a first sharpness metric indicating sharpness of a boundary of the limbal ring and sclera and/or iris for the first image captured by imaging sensor at the wavelength range within at least one of NIR and short wave infrared SWIR, computing a second sharpness metric indicating sharpness of a boundary of the limbal ring and sclera and/or iris for a second image captured by a second imaging sensor at a second wavelength range within a visible light spectrum, computing a difference between the first sharpness metric and the second sharpness metric, and detecting likelihood of the first image depicting the artificial iris when the difference is above a threshold indicating a non-significant difference between sharpness of the boundary depicted in the first image and sharpness of the boundary depicted in the second image.

In a further implementation form of the first, second, and third aspects, further comprising detecting likelihood of the first image excluding the artificial iris when the difference is below a threshold indicating a significant difference between diffusion of the boundary depicted in the first image and sharpness of the boundary depicted in the second image.

In a further implementation form of the first, second, and third aspects, analyzing the at least the portion of the limbal ring comprises detecting a boundary of the artificial iris worn as a contact lens.

In a further implementation form of the first, second, and third aspects, further comprising computing a sharpness metric indicating sharpness of a boundary of the contact lens, and detecting likelihood of the image depicting the artificial iris when the sharpness metric is above a threshold indicating presence of the contact lens.

In a further implementation form of the first, second, and third aspects, the image excludes the artificial iris when the sharpness metric is below the threshold, for indicating lack of presence of the contact lens.

In a further implementation form of the first, second, and third aspects, analyzing the at least the portion of the limbal ring comprises: wherein the image comprises a first image, computing a first visibility metric indicating visibility of the boundary of the contact lens for the first image captured by imaging sensor at the wavelength range within at least one of NIR and short wave infrared SWIR, computing a second visibility metric indicating visibility of the boundary of the contact lens for a second image captured by a second imaging sensor at a second wavelength range within a visible light spectrum, computing a difference between the first visibility metric and the second visibility metric, and detecting likelihood of the first image depicting the artificial iris when the difference is above a threshold indicating a significant difference between visibility of the boundary depicted in the first image and visibility of the boundary depicted in the second image.

In a further implementation form of the first, second, and third aspects, further comprising detecting likelihood of the first image excluding the artificial iris when the difference is below a threshold indicating a non-significant difference between visibility of the boundary depicted in the first image and visibility of the boundary depicted in the second image.

In a further implementation form of the first, second, and third aspects, further comprising, in response to detecting likelihood of the artificial iris, at least one of: generating an alert for presentation on a display, generating instructions for alerting authorities, triggering a second security test, and generating instructions for preventing access to a secure site by the individual.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to security and, more specifically, but not exclusively, to systems and methods for securing iris recognition systems.

An aspect of some embodiments of the present invention relates to systems, methods, computing devices, and/or code instructions (stored on a data storage device and/or executable by one or more processors) for detecting an artificial iris used in an attempt to breach security of an iris recognition system. A processor analyzes at least a portion of a limbal ring (the outer black ring between the cornea and sclera) of an eyeball depicted in an image of an iris of an individual captured by an imaging sensor. The image is captured at a wavelength range within a near infrared (NIR) spectrum and/or a short wave infrared (SWIR) spectrum. The processor detects likelihood of an artificial iris worn by the individual according to the analysis of at least the portion of the limbal ring.

At least some implementations of the systems, methods, computing devices, and/or code instructions (stored on a data storage device and/or executable by one or more processors) described herein address the technical problem of biometric spoofing of iris recognition systems. The importance of biometrics-based ID has been on the rise, with a special emphasis on iris-based ID systems (airports and national DB). Biometric spoofing is one of the greatest challenges these systems face, as their importance increases. For example, attackers that steal biometric data of irises may create a mock iris and/or cornea contact lens using the stolen data in an attempt to gain access as the person whose biometric data was stolen. In another example, attackers may create and/or use an image of using the stolen biometric data and/or using a stolen iris image. Attacks based on stolen biometric data of irises pose an especially difficult technical problem, since one stolen, the biometric data cannot be deleted and replaced, since the iris of a person cannot be changed.

At least some implementations of the systems, methods, computing devices, and/or code instructions described herein improve the technology of security systems, by analyzing images of irises of individuals to detect a spoof attack, optionally via a fraudulent iris, for example, mock iris and/or cornea contact lens made to appear as if belonging to a person registered with an iris recognition system. Detecting whether an image of an iris is a spoof is important in and of itself, for example, enabling blocking potential attacks.

At least some implementations of the systems, methods, computing devices, and/or code instructions described herein improve over existing iris recognition systems, by enabling detection of iris images that are a spoof, for example, mock iris and/or cornea contact lens made to appear as if belonging to a person registered with an iris recognition system. Some other approaches analyze images of the iris to validate the individual, where the images are captured at wavelengths that are different than wavelengths captured by some embodiments. For example, in other approaches the images are captured in the visible light range, while in contrast in some embodiments described herein the images are captured in the NIR and/or SWIR range. Yet other approaches attempt to prevent such attacks, for example, by using liveness detection techniques to verity that the iris being scanned belongs to a live person and is not a fake or stolen image. Such approaches are different than approaches described herein.

At least some implementations of the systems, methods, computing devices, and/or code instructions described herein address the aforementioned technical problem, and/or improve the aforementioned technical field, and/or improve the aforementioned existing systems, by analyzing at least a portion of a limbal ring depicted in an image captured at the NIR and/or SWIR wavelength range to detect likelihood of an artificial iris work by an individual.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
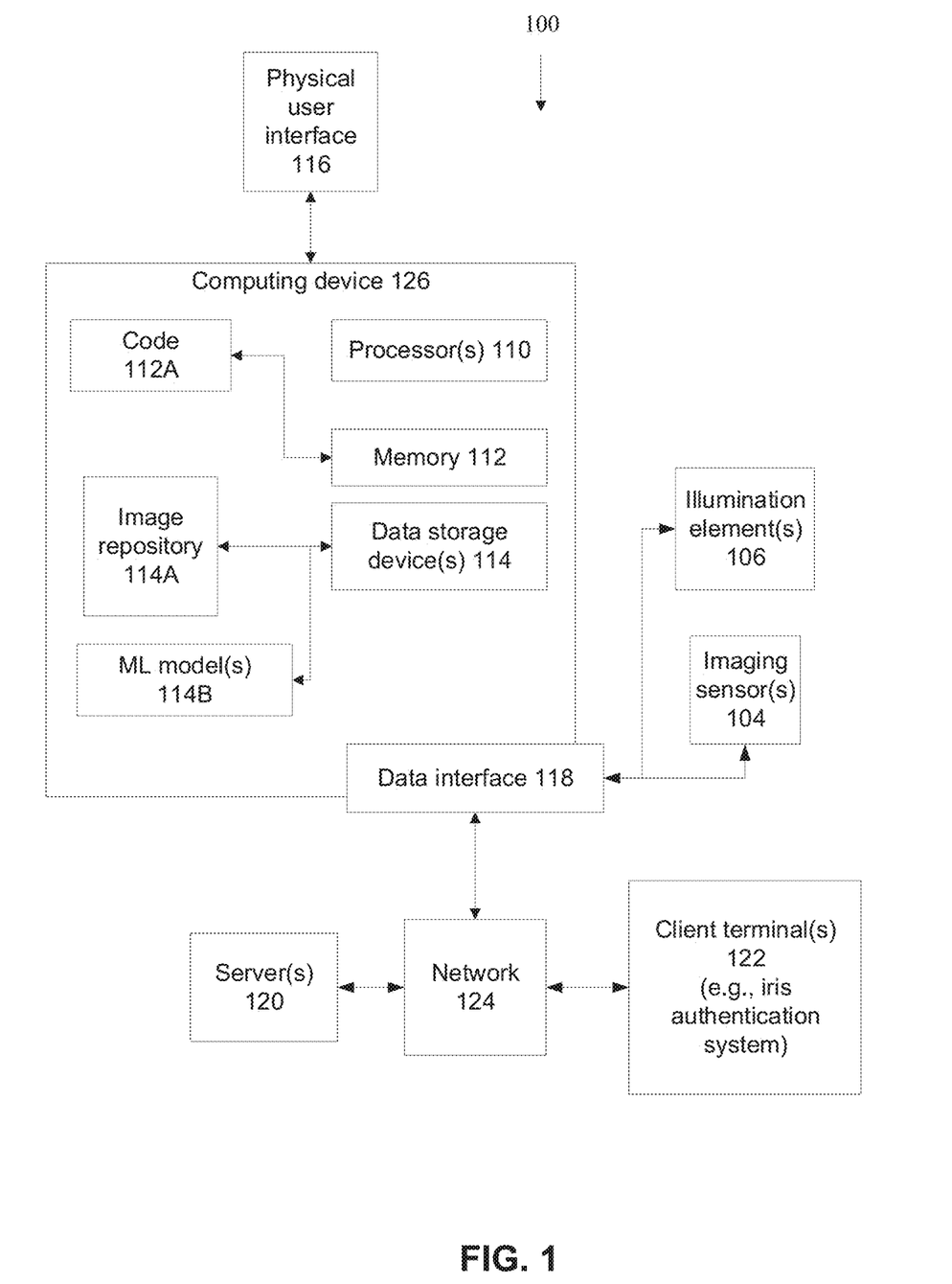
FIG. 1 is a schematic of a block diagram of components of a system for automatic detection of an artificial iris worn by an individual, in accordance with some embodiments of the present invention.
Figure 2:
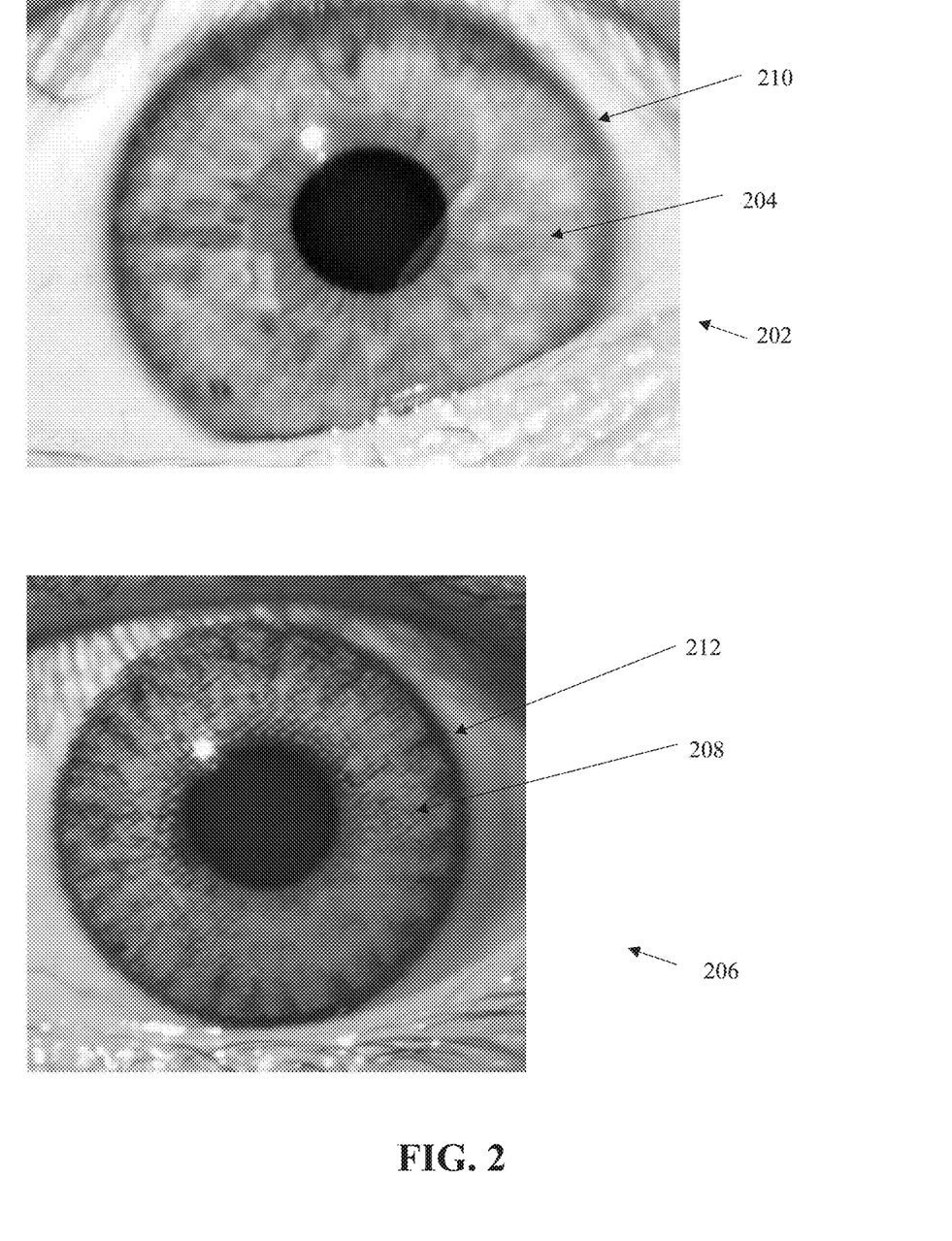
FIG. 2 is an image of a real iris, and an image of an artificial iris, captured in the visible light range, to help understand some embodiments of the present invention.
Figure 3:
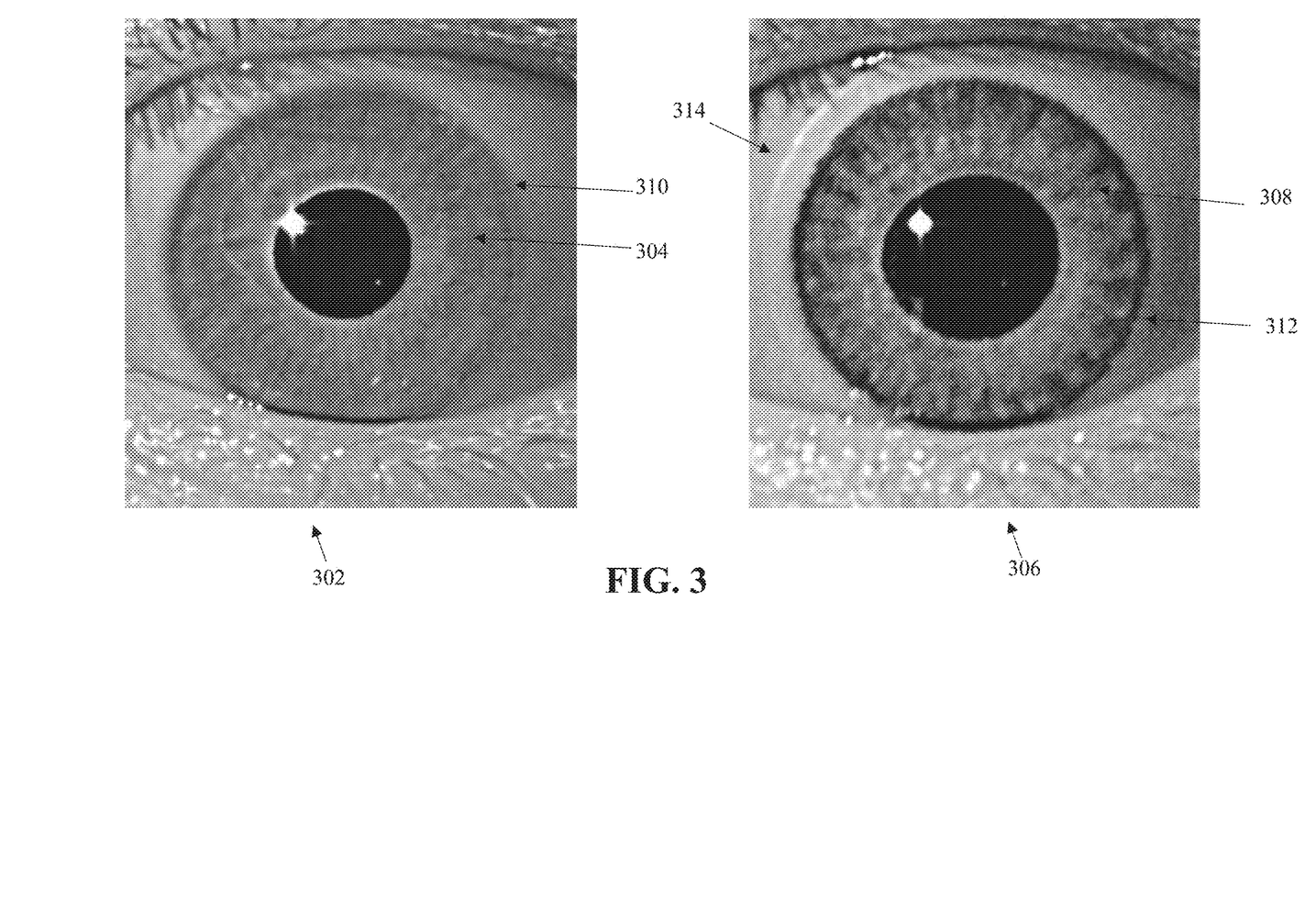
FIG. 3 is an image of a real iris, and an image of an artificial iris, captured in the SWIR range at 1050 nanometers (nm), in accordance with some embodiments of the present invention.
Figure 4:
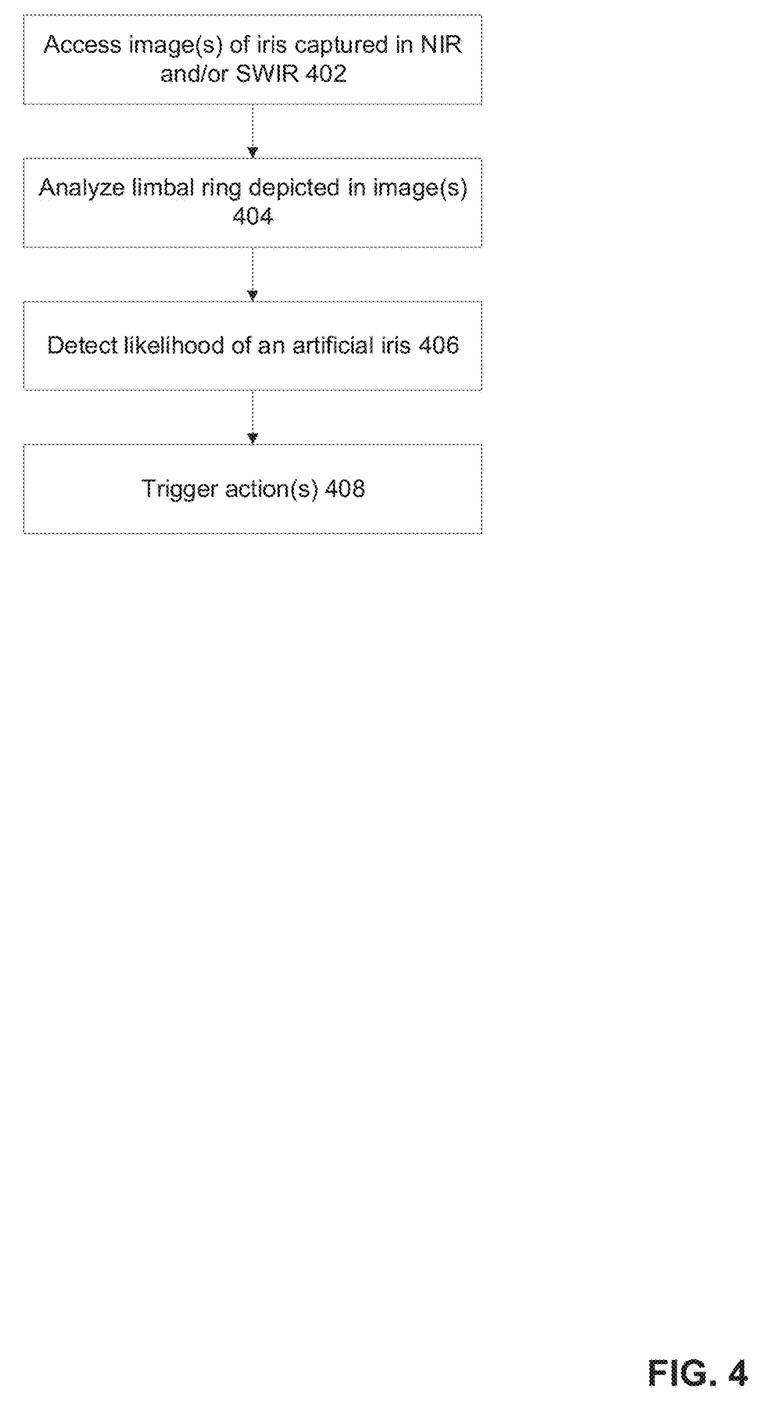
FIG. 4 is a flowchart of a method for automatic detection of an artificial iris worn by an individual, in accordance with some embodiments of the present invention.

Reference is now made to FIG. 1, which is a schematic of a block diagram of components of a system 100 for automatic detection of an artificial iris worn by an individual, in accordance with some embodiments of the present invention. The artificial iris may be worn by the individual, for example, in an attempt to evade detection of their real identify by hiding their real iris, and/or in an attempt to gain access to a secure site by using an artificial iris created to mimic the iris of another individual with access. Reference is also made to FIG. 2, which is an image 202 of an iris 204 (i.e., without an artificial iris), and an image 206 of an artificial iris 208, captured in the visible light range, to help understand some embodiments of the present invention. Reference is also made to FIG. 3, which is an image 302 of an iris 304 (i.e., without an artificial iris), and an image 306 of an artificial iris 308, captured in the SWIR range, at 1050 nm, in accordance with some embodiments of the present invention. Reference is also made to FIG. 4, which is a flowchart of a method for automatic detection of an artificial iris worn by an individual, in accordance with some embodiments of the present invention.

System 100 includes a computing device 126 implemented as, for example one or more and/or combination of: a group of connected devices, a client terminal, a server, a computing cloud, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

Different architectures of computing device 126 may be implemented. For example, computing device 126 may be implemented as a server providing remote artificial iris detection services to remote client terminals 122, such as remote iris authentication systems. In the centralized architecture, each remote biometric authentication system may send locally captured images of the iris to computing device 126 for centralized analysis. Computing device 126 may send the outcome of the analysis to each respective client terminal 122. In another example, each computing device 126 may be implemented as a local architecture, for example, part of a local iris authentication system, such as installed at an airport to board a plane, and/or at an automatic entrance into a secure building to gain access to the building. Computing device 126 may locally analyze images to determine whether a subject is wearing an artificial iris.

Computing device 126 is in communication with one or more imaging sensors 104, which may be near infrared sensors (NIR) that capture NIR images of the iris of the individual at NIR wavelength, optionally greater than about 850 nm, or about 941 nm, or other values. Alternatively or additionally, image sensor(s) 104 are short wave infrared (SWIR) sensor(s) 104 that capture SWIR image(s) of the scene at a SWIR wavelength range, for example, about 1050 nm, or about 1250 nm or about 1400 nm, or other values, or ranges thereof (e.g., about 1050-1400 nm, or 1050-1250 nm, or 1250-1400 nm, or other value). The sensor(s) 104 may be NIR and/or SWIR, for example, in the range of about 850 nanometers and about 1400 nanometers, or other values described herein and/or other values not explicitly stated. Examples of SWIR sensor(s) 104 include: Plasmon based CMOS, bolometer array based FIR, InGaAs camera, and 3D passive imaging.

Computing device 126 is in communication with one or more SWIR illumination element(s) 106 that generate SWIR illumination at the SWIR wavelength range detectable by the SWIR sensor 104. SWIR illumination element(s) 106 may be used to generate SWIR illumination in locations where there is little or no ambient SWIR illumination, for example, indoors where visible light illumination is via light emitting diodes (LEDs).

Alternatively or additionally, imaging sensors 104 include one or more visible light sensors (e.g., CCD, CMOS) such as a camera. The visible light images may be analyzed with respect to the NIR/SWIR images to detect presence of the artificial iris, as described herein.

Computing device 126 includes a hardware processor(s) 110, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 110 may include a single processor, or multiple processors (homogenous or heterogeneous) arranged for parallel processing, as clusters and/or as one or more multi core processing devices.

Computing device 126 includes a memory 112, which stores code 112A for execution by processor(s) 110. Code 112A may include program instructions for implementing one or more features of the method described with reference to FIG. 4, for analyzing the images to determine whether an individual's iris depicted in the image(s) is an artificial iris, or optionally a real iris. Memory 112 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing device 126 may include a data storage device(s) 114, which may store data, for example, image repository 114A that stores the captured NIR and/or SWIR images and optional visible light images, and/or ML model(s) 114B as described herein. Data storage device(s) 114 may be implemented as, for example, a memory, a local hard-drive, virtual storage, a removable storage unit, an optical disk, a storage device, and/or as a remote server and/or computing cloud (e.g., accessed using a network connection).

System 100 may include one or more user interfaces 116 that includes a mechanism for user interaction, for example, to enter data (e.g., select iris authentication) and/or to view data (e.g., whether an artificial iris is detected and/or whether access has been granted). Exemplary physical user interfaces 116 include, for example, one or more of, a touchscreen, a display, gesture activation devices, a keyboard, a mouse, and voice activated software using speakers and microphone.

System may include one or more data interfaces 118. Data interface(s) 118 provides communication with external devices (e.g., server(s) 120 and/or client terminal(s) 122) optionally over a network 124, for example, for sending a message indicating when the artificial iris is detected to an administrative server 120 which may alert authorities and/or take other action, and/or receive images from client terminal(s) 122 for centralized analysis.

Data interface 118 may be implemented as, for example, one or more of, a network interface, a USB port, a network interface card, an antenna, a wireless interface to connect to a wireless network, a short range wireless connection, a physical interface for connecting to a cable for network connectivity, a virtual interface implemented in software, network communication software providing higher layers of network connectivity, and/or other implementations.

Network 124 may be implemented as, for example, the internet, a broadcast network, a local area network, a virtual network, a wireless network, a cellular network, a local bus, a point to point link (e.g., wired), and/or combinations of the aforementioned. It is noted at a cable connecting processor(s) 110 and another device may be referred to herein as network 124.

Communication between processor(s) 110 and/or server(s) 120 and/or client terminal(s) 122 over network 124 may be implemented, for example, via an application programming interface (API), software development kit (SDK), functions and/or libraries and/or add-ons added to existing applications executing on server(s) 120 and/or client terminal(s) 122, and/or an application for download and execution on server(s) 120 and/or client terminal(s) 122 that communicates with processor(s) 110, function and/or interface calls to code executed by processor(s) 110.

Referring now back to FIG. 2, images 202 and 206 are captured in the visible light range. A limbal ring 210 is clearly visible in iris 204 (i.e., no artificial iris) of image 202. A limbal ring 212 is also clearly visible in artificial iris 208 of image 206. As such, in the visible light range, limbal rings appear similar, whether the iris is real or artificial, and cannot be used to differentiate between the two cases.

Referring now back to FIG. 3 images 302 and 306 are captured in the SWIR range at 1050 nm. A limbal ring 310 is blurry and difficult to visualize in iris 304 of image 302. In contrast, Inventors discovered that a limbal ring 312 is clearly visible in artificial iris 308 of schematic 306. Moreover, Inventors discovered that a boundary 314 of a contact lens which includes artificial iris 308 is clearly visible in image 306. As described herein, the presence of artificial iris 308 may be determined by analyzing the visual appearance of limbal ring 312 in NIR and/or SWIR images 306, and/or by detecting the presence of boundary 314 of the contact lens of the artificial iris.

Referring now back to FIG. 4, at 402, a processor accesses an image of an iris of an individual. The image is captured by an imaging sensor at a wavelength range within near infrared (NIR) and/or short wave infrared (SWIR). Inventors discovered that using a NIR and/or SWIR wavelength for capturing images reveals different iris and/or cornea features that are not visible in VIS-based systems, which may be used to detect an artificial iris.

Optionally, the wavelength is greater than 941 nanometers. It is noted that standard iris security systems analyze images capture images at the visible light wavelength range at 940 nanometers or less, for example, within 859-940 nanometers. The wavelength range may be, for example, between about 941 nanometers and about 1400 nanometers.

Optionally, an illumination source is activated for illuminating the iris of the individual with an illumination at the wavelength range. The illumination source may be activated when no or little NIR and/or SWIR ambient illumination is available from the sun, for example, indoors where LEDs and/or other visible light illumination sources do not generate illumination and/or do not generate significant illumination at the NIR and/or SWIR wavelength. Typically, existing iris recognition systems do not illuminate the scene with a specific light source, and do not illuminate at the wavelength range of NIR and/or SWIR. The illumination may be straight on and/or at an angle. The illumination source may be diffused for reducing specular reflections.

At 404, a processor analyzes at least a portion of a limbal ring depicted in the image of the iris of the individual. The entire limbal ring may be analyzed, or a portion thereof, for example, within an arc angle of about 45 degrees, or 60, or 90, or 180, or 270 degrees, or other smaller, intermediate, or larger values.

One or more approaches may be used for analyzing the limbal ring, or portion thereof. Some exemplary approaches are now described.

In an exemplary approach, the analysis is performed by computing a sharpness metric indicating sharpness of a boundary of the limbal ring and sclera and/or iris. Sharpness may be measured, for example, by edge-detection filters, like the Canny edge-detector, Sobel filter or others.

In another exemplary approach, the analysis is performed by feeding at least a portion of the limbal ring into a machine learning (ML) model. The portion of the limbal ring may be segmented from the image, for example, by a segmentation model trained on a training dataset of images of irises of sample individuals, labelled with a ground truth indication of the segmentation of at least a portion of the limbal ring, for example, by a user drawing borders around the portion of the limbal ring. The segmented portion of the image may be fed into the ML model, for example, a neural network and/or analyzed using non-ML approaches such as image processing approaches, and/or similarity metrics such as root mean square error and/or using a structural similarity index.

The ML model may be trained using the following exemplary approach. Multiple sample images of sample individuals are obtained. Each sample image depict an iris of a sample subject captured by the imaging sensor at the NIR and/or SWIR wavelength range. A first set of sample images depict the sample subjects wearing an artificial iris. A second set of sample images depict the sample subjects that are not wearing the artificial iris. At least a portion of the limbal ring is segmented, automatically by the segmentation ML model and/or manually by a user. A training record that includes the segmented limbal ring or portion thereof, is created. The record includes a ground truth indicating whether the sample subject is wearing an artificial iris or is not wearing the artificial iris. A multi-record training dataset that includes multiple training records of the sample images is created. The machine learning model is trained on the training dataset.

In another implementation, features are extracted from the region of the image depicting the limbal ring or portion thereof, and the extracted features are fed into a ML model (e.g., based on a convolutional neural network architecture). Such ML model may be trained on a training dataset of features extracted from sample images of sample individuals, labelled with a ground truth label indicating whether the sample individual is wearing an artificial iris or not.

In yet another implementation, the whole image is fed into a ML model (e.g., based on a convolutional neural network architecture and/or transformer-based ML model), for example, a neural network. Such ML model may be trained on a training dataset of sample images of sample individuals, labelled with a ground truth label indicating whether the sample individual is wearing an artificial iris or not.

In yet another exemplary approach, the analysis is performed by comparing blurriness of the limbal or portion thereof between the image captured the NIR and/or SWIR range, and another image captured at the visible light range. A first sharpness metric indicating sharpness of a boundary of the limbal ring (or portion thereof) and sclera and/or iris is computed for the image captured at the NIR and/or SWIR wavelength range. A second sharpness metric indicating sharpness of the boundary of the limbal ring (or portion thereof) and sclera and/or iris is computed for the other image captured within the visible light spectrum. A difference between the first sharpness metric and the second sharpness metric may be computed.

In yet another exemplary approach, the analysis is performed by detecting a boundary of the artificial iris worn as a contact lens, i.e., the circumference of the contact lens on the eye. A sharpness metric indicating sharpness of the boundary of the contact lens may be computed. The sharpness may be measured, for example, by edge-detection filters, like the Canny edge-detector, Sobel filter or others. Inventors discovered that when the artificial iris is worn as a contact lens over the cornea, the boundary of the contact lens appears sharp in NIR and/or SWIR images.

In yet another exemplary approach, the analysis is performed by comparing visibility of a boundary of the contact lens between the image captured the NIR and/or SWIR range, and another image captured at the visible light range. A first visibility metric indicating visibility of the boundary of the contact lens is computed for the image captured at the NIR and/or SWIR wavelength range. A second visibility metric indicating visibility of the boundary of the contact lens is computed for another image captured by another imaging sensor at within a visible light spectrum wavelength range. A difference between the first visibility metric and the second visibility metric may be computed. Inventors discovered that the boundary of the contact lens is more visible in the NIR and/or SWIR spectrum than in the visible light spectrum.

At 406, the processor detects likelihood of an artificial iris being worn by the individual according to the analysis of the limbal ring or portion thereof. The likelihood of the artificial iris may be according to the approach used for analyzing the limbal ring.

When the analysis includes computing the sharpness metric, likelihood of the artificial iris is detected when the sharpness metric is above a threshold indicating sharpness of the boundary. The sharpness metric being above the threshold may indicate a strong, non-diffused limbal ring. This is based on Inventor's discovery that the artificial iris creates a sharp boundary between the limbal ring and sclera and/or iris as depicted in NIR and/or SWIR wavelength images, while the boundary when a real iris is present (i.e., excluding the artificial iris) appears diffused in NIR and/or SWIR wavelength images. Inventors discovered that the limbal ring is very visible in the VIS spectrum, but very diffused in NIR\SWIR wavelengths, for example, between 940-1100 nm. Artificial contact lenses that are designed for spoofing will make the limbal ring prominent, in attempt to successfully penetrate visible light based iris identification systems.

The image is determined to likely exclude the artificial iris when the sharpness metric is below the threshold, for indicating diffusion of the boundary.

When the analysis includes feeding the image or segmented portion into the ML model, the likelihood of the subject wearing an artificial iris is obtained as an outcome of the machine learning model.

When the analysis includes computing the sharpness metric(s), likelihood of the subject wearing the artificial iris may be determined when the difference between the first and second sharpness metrics is above a threshold indicating a non-significant difference between sharpness of the boundary depicted in the NIR and/or SWIR image and sharpness of the boundary depicted in the visible light image. This is based on Inventor's discovery that when the subject is wearing the artificial iris, a sharp boundary is visible on both NIR and/or SWIR images, and visible light images. In the NIR and/or SWIR spectrum, the limbal ring appears as a sharp boundary rather than the diffused look it naturally has in the visible light range, creating a distinguishable difference that can be used in order to separate real and fake images. Alternatively, likelihood of the NIR and/or SWIR image excluding the artificial iris (i.e., the subject is not wearing the artificial iris) may be determined when the difference is below a threshold indicating a significant difference between diffusion of the boundary of the limbal ring depicted in the NIR and/or SWIR image and sharpness of the boundary depicted in the visible light image. This is based on Inventor's discovery that when no artificial iris is worn, the limbal ring appears as a sharp boundary in visible light images, and as a blurry boundary in NIR and/or SWIR images.

When the analysis includes detecting the boundary of the contact lens, likelihood of the image depicting the artificial iris may be determined when the sharpness metric computed for the boundary of the contact lens is above a threshold indicating presence of the contact lens. Likelihood of the image excluding the artificial contact lens may be determined when the sharpness metric is below the threshold.

When the analysis includes computing the visibility metric(s), likelihood of the subject wearing the artificial iris may be determined when the difference between the first and second visibility metrics is above a threshold indicating a significant difference between visibility of the boundary depicted in the NIR and/or SWIR image and visibility of the boundary depicted in the visible light image. Alternatively, likelihood of the NIR and/or SWIR image excluding the artificial iris may be determined when the difference is below a threshold indicating a non-significant difference between visibility of the boundary of the contact lens depicted in the NIR and/or SWIR image and visibility of the boundary of the contact lens depicted in the visible light image. This is based on Inventor's discovery that when the artificial iris is worn as a contact lens, the boundary of the contact lens is clearly visible in the NIR and/or SWIR image, but is not clearly visible in visible light images. When no contact lens is worn, no boundary of the contact lens is visible in NIR and/or SWIR images, and in visible light images.

A standard contact lens which is uncolored and used for correction of vision that is not designed as an artificial iris may not necessarily be detected by at least some approaches described herein. Wearing of the standard uncolored contact lens is unlikely to be inaccurately detected as the artificial iris by at least some embodiments. In images captured at the NIR and/or SWIR wavelength range, the non-colored contact lens is unlikely to depict at least the portion of the limbal ring. It is noted that in embodiments that detect the boundary between the contact lens and the sclera and/or iris, the non-colored contact lens may be incorrectly detected as likely being the artificial iris. In embodiments in which the boundary detection is used, a second security test may be triggered, for example, as described with reference to 408.

At 408, in response to detecting likelihood of the artificial iris, one or more actions may be triggered. Exemplary action include:

Generating an alert for presentation on a display, for example, a message indicating "error" is presented on a screen in close proximity to the image sensor of the iris detection system.

Generating instructions for alerting authorities. For example, a message is sent to alert security personnel to investigate the subject attempting to gain access.

Triggering a second security test. For example, asking the user to provide another unique identifier, such as fingerprints and/or voice recognition. The second security test may be used, for example, to reduce the number of false alarms due to erroneous detection of artificial irises, for example, when the user has an infection of the iris the artificial iris may be incorrectly detected.

Generating instructions for preventing access to a secure site by the individual. For example, the subject may be locked out of the secure site by locking a door and/or updating a server to prevent granting access to a door using a keycard of the subject.

Streaming the video from the image sensor and/or another camera capturing images in the visible light range, and optional audio, to a remote station for remote viewing by security. Security may view the images and/or speak to the subject to further investigate the subject.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant iris imaging systems will be developed and the scope of the term iris imaging system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of detecting an attempt to breach security of an iris recognition system by an artificial iris, comprising:

analyzing at least a portion of a limbal ring boundary depicted in an image of an iris of an individual captured by an imaging sensor at a wavelength range within at least one of near infrared (NIR) and short wave infrared (SWIR), wherein the limbal ring boundary comprises a transition region between the iris and sclera;

computing a sharpness metric that quantifies geometric sharpness of the limbal ring boundary by measuring edge definition characteristics of the transition region between the iris and sclera; and detecting likelihood of an artificial iris worn by the individual according to the analysis of the at least the portion of the limbal ring by comparing the computed sharpness metric to a predetermined threshold value.

2. The computer implemented method of claim 1, wherein the wavelength range within at least one of NIR and SWIR is between about 850 nanometers and about 1400 nanometers.

3. The computer implemented method of claim 1, further comprising activating an illumination source for illuminating the iris of the individual with an illumination at the wavelength range.

4. The computer implemented method of claim 1, wherein when the sharpness metric is above said predetermined threshold the artificial iris is detected as worn by the individual.

5. The computer implemented method of claim 4, wherein the image likely excludes the artificial iris when the sharpness metric is below the threshold, for indicating diffusion of the boundary.

6. The computer implemented method of claim 1, wherein analyzing the at least the portion of the limbal ring boundary comprises segmenting the portion of the limbal ring, and feeding the segmented at least the portion of the limbal ring into a machine learning model, wherein the detecting the likelihood of the artificial iris is obtained as an outcome of the machine learning model.

7. The computer implemented method of claim 6, further comprising training the machine learning model by:
   for each sample image of a plurality of sample images of a plurality of sample individuals, each sample image depicting an iris of a sample subject captured by the imaging sensor at the wavelength range within at least one of NIR and SWIR, wherein a first set of sample images depict the sample subjects wearing an artificial iris and a second set of sample images depict the sample subjects that are not wearing the artificial iris:
      segmenting at least a portion of the limbal ring, and
      creating a training record including the segmented at least the portion of the limbal ring, and a ground truth indicating whether the sample subject is wearing an artificial iris or is not wearing the artificial iris;
   creating a multi-record training dataset including a plurality of the training records for the plurality of sample images; and
   training the machine learning model on the training dataset.

8. The computer implemented method of claim 1, wherein analyzing the at least the portion of the limbal ring boundary comprises:
   wherein the image comprises a first image;
   computing a first sharpness metric indicating sharpness of a boundary of the limbal ring and sclera and/or iris for the first image captured by imaging sensor at the wavelength range within at least one of NIR and short wave infrared SWIR;
   computing a second sharpness metric indicating sharpness of a boundary of the limbal ring and sclera and/or iris for a second image captured by a second imaging sensor at a second wavelength range within a visible light spectrum;
   computing a difference between the first sharpness metric and the second sharpness metric; and
   detecting likelihood of the first image depicting the artificial iris when the difference is above a threshold indicating a non-significant difference between sharpness of the boundary depicted in the first image and sharpness of the boundary depicted in the second image.

9. The computer implemented method of claim 8, further comprising detecting likelihood of the first image excluding the artificial iris when the difference is below a threshold indicating a significant difference between diffusion of the boundary depicted in the first image and sharpness of the boundary depicted in the second image.

10. The computer implemented method of claim 1, wherein analyzing the at least the portion of the limbal ring boundary comprises detecting a boundary of the artificial iris worn as a contact lens.

11. The computer implemented method of claim 10, further comprising computing a sharpness metric indicating sharpness of a boundary of the contact lens, and detecting likelihood of the image depicting the artificial iris when the sharpness metric is above a threshold indicating presence of the contact lens.

12. The computer implemented method of claim 11, wherein the image excludes the artificial iris when the sharpness metric is below the threshold, for indicating lack of presence of the contact lens.

13. The computer implemented method of claim 10, wherein analyzing the at least the portion of the limbal ring boundary comprises:
   wherein the image comprises a first image;
   computing a first visibility metric indicating visibility of the boundary of the contact lens for the first image captured by imaging sensor at the wavelength range within at least one of NIR and short wave infrared SWIR;
   computing a second visibility metric indicating visibility of the boundary of the contact lens for a second image captured by a second imaging sensor at a second wavelength range within a visible light spectrum;
   computing a difference between the first visibility metric and the second visibility metric; and
   detecting likelihood of the first image depicting the artificial iris when the difference is above a threshold indicating a significant difference between visibility of the boundary depicted in the first image and visibility of the boundary depicted in the second image.

14. The computer implemented method of claim 13, further comprising detecting likelihood of the first image excluding the artificial iris when the difference is below a threshold indicating a non-significant difference between visibility of the boundary depicted in the first image and visibility of the boundary depicted in the second image.

15. The computer implemented method of claim 1, further comprising, in response to detecting likelihood of the artificial iris, at least one of: generating an alert for presentation on a display, generating instructions for alerting authorities, triggering a second security test, and generating instructions for preventing access to a secure site by the individual.

16. A system for detecting an attempt to breach security of an iris recognition system by an artificial iris, comprising:
   at least one processor executing a code for:
      analyzing at least a portion of a limbal ring boundary depicted in an image of an iris of an individual captured by an imaging sensor at a wavelength range within at least one of near infrared (NIR) and short wave infrared (SWIR), wherein the limbal ring boundary comprises a transition region between the iris and sclera;
      computing a sharpness metric that quantifies geometric sharpness of the limbal ring boundary by measuring edge definition characteristics of the transition region between the iris and sclera; and detecting likelihood of an artificial iris worn by the individual according to the analysis of the at least the portion of the limbal ring by comparing the computed sharpness metric to a predetermined threshold value.

17. A non-transitory medium storing program instructions for detecting an attempt to breach security of an iris recognition system by an artificial iris, which when executed by at least one processor, cause the at least one processor to:

analyze at least a portion of a limbal ring boundary depicted in an image of an iris of an individual captured by an imaging sensor at a wavelength range within at least one of near infrared (NIR) and short wave infrared (SWIR), wherein the limbal ring boundary comprises a transition region between the iris and sclera;

computing a sharpness metric that quantifies geometric sharpness of the limbal ring boundary by measuring edge definition characteristics of the transition region between the iris and sclera; and detect likelihood of an artificial iris worn by the individual according to the analysis of the at least the portion of the limbal ring by comparing the computed sharpness metric to a predetermined threshold value.

\* \* \* \* \*